(12) United States Patent
Klasing et al.

(10) Patent No.: US 7,578,653 B2
(45) Date of Patent: Aug. 25, 2009

(54) OVATE BAND TURBINE STAGE

(75) Inventors: Kevin Samuel Klasing, Springboro, OH (US); Ching-Pang Lee, Cincinnati, OH (US); Scott David Hunter, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 11/642,001

(22) Filed: Dec. 19, 2006

(65) Prior Publication Data

US 2008/0145216 A1 Jun. 19, 2008

(51) Int. Cl.
*F01D 11/02* (2006.01)
*F01D 9/04* (2006.01)
(52) U.S. Cl. .......... 415/115; 415/173.7; 415/174.5; 415/189; 415/191; 415/209.2; 415/210.1; 416/95; 416/97 R
(58) Field of Classification Search ............ 415/115, 415/116, 173.7, 174.5, 189–191, 208.2, 209.2, 415/209.3, 209.4, 210.1; 416/95, 96 R, 96 A, 416/97 R
See application file for complete search history.

(56) References Cited

U.S. PATENT DOCUMENTS 3,945,758 A 3/1976 Lee
4,187,054 A 2/1980 Landis et al.
4,353,679 A 10/1982 Hauser
4,403,917 A 9/1983 Laffitte et al.
4,702,670 A 10/1987 Winter
5,211,536 A 5/1993 Ackerman et al.
5,224,822 A 7/1993 Lenahan et al.
5,252,026 A 10/1993 Shepherd
5,358,374 A 10/1994 Correia et al.
5,372,476 A 12/1994 Hemmelgarn et al.
5,522,698 A * 6/1996 Butler et al. ............ 415/174.5
5,609,466 A 3/1997 North et al.
6,077,035 A 6/2000 Walters et al.
6,398,488 B1 6/2002 Solda et al.
6,481,959 B1 11/2002 Morris et al.
6,572,335 B2 * 6/2003 Kuwabara et al. ......... 416/97 R
7,140,835 B2 11/2006 Lee et al.
7,249,928 B2 * 7/2007 Klasing et al. ............ 415/115
7,507,069 B2 * 3/2009 Kizuka et al. ............ 415/209.2

OTHER PUBLICATIONS

Co-pending U.S. Appl. No. 11/642,002, filed Dec. 19, 2006.

* cited by examiner

*Primary Examiner*—Christopher Verdier
(74) *Attorney, Agent, or Firm*—William S. Andes; Francis L. Conte

(57) ABSTRACT

A turbine stage includes a stator nozzle having a row of vanes mounted between inner and outer bands. The inner band terminates in an ovate ledge converging aft from the vanes with radially outer and inner convex surfaces joined at a convex apex. The ovate ledge reduces aerodynamic losses at the rotary seal with a row of following turbine rotor blades.

22 Claims, 3 Drawing Sheets

OVATE BAND TURBINE STAGE

BACKGROUND OF THE INVENTION

The present invention relates generally to gas turbine engines, and, more specifically, to turbine efficiency therein.

In a gas turbine engine, air is pressurized in a compressor and mixed with fuel in a combustor for generating hot combustion gases. Energy is extracted from the combustion gases in turbine stages which power the compressor through one drive shaft, and produce additional work for powering an upstream fan in a turbofan aircraft engine application, or driving an external drive shaft for marine and industrial (M&I) applications.

The basic core engine typically includes a multistage axial compressor having rows of compressor blades and corresponding guide vanes which pressurize ambient air in stages and correspondingly increase the temperature thereof. The air discharged from the aft end of the compressor has the highest pressure, commonly referred to as compressor discharge pressure (CDP), and a correspondingly high temperature.

In an exemplary configuration, the compressor may have seven stages for increasing air pressure many times atmospheric pressure along with many hundreds of degrees of temperature increase due to the compression cycle. A fewer or greater number of compression stages may be used as desired for the specific design of the gas turbine engine and its intended use.

A majority of the CDP air discharged from the compressor is mixed with fuel in the combustor for generating hot combustion gases. These combustion gases then undergo an expansion cycle in the several turbine stages for extracting energy therefrom which correspondingly reduces the pressure of the combustion gases and the temperature thereof. A high pressure turbine (HPT) immediately follows the combustor and is used to power the compressor blades in the core engine.

A low pressure turbine (LPT) follows the HPT and drives the second shaft for powering the upstream fan in the turbofan engine application, or driving an external drive shaft for M&I applications.

The overall efficiency of the gas turbine engine is dependent on the efficiency of air compression, efficiency of combustion, and efficiency of combustion gas expansion in the turbine stages.

Each turbine stage typically includes an upstream turbine nozzle or stator having a row of nozzle vanes which direct the combustion gases downstream through a corresponding row of turbine rotor blades. The blades are typically mounted to the perimeter of a supporting rotor disk in corresponding dovetail slots formed therein.

The turbine blades and vanes are typically hollow airfoils with corresponding internal cooling channels therein which receive compressor discharge air for cooling thereof during operation. The hollow blades and vanes typically include various rows of film cooling and other discharge holes through the pressure and suction sidewalls thereof for discharging the spent internal cooling air in corresponding external films for further protecting the airfoils.

The main turbine flowpath is designed to confine the combustion gases as they flow through the engine and decrease in temperature and pressure from the combustor. The various cooling circuits for the turbine components are independent from the main flowpath and must be provided with cooling air at sufficient pressure to prevent ingestion of the hot combustion gases therein during operation.

For example, suitable rotary seals are provided between the stationary turbine nozzles and the rotating turbine blades to prevent ingestion or backflow of the hot combustion gases into the cooling circuits.

Since the airfoils of the nozzle vanes and turbine blades typically include rows of cooling air outlet holes, the cooling air must also have sufficient pressure greater than that of the external combustion gases to provide a suitable backflow margin to prevent ingestion of the hot combustion gases into the turbine airfoils themselves.

Since the combustion gases and cooling air are channeled through corresponding flowpaths or flow circuits in the engine, they are subject to various aerodynamic losses which further decrease engine efficiency. Fluid flow is subject to friction or drag losses, flow separation losses, and mixing losses all of which reduce pressure and decrease efficiency.

The rotary seal between the first stage turbine nozzle and first stage turbine rotor blades is at one critical site which significantly affects turbine efficiency. The nozzle including its inner band is a stationary or stator component immediately followed downstream by the rotating turbine blades and their corresponding rotating platforms which form the radially inner flowpath boundary for the hot combustion gases being channeled through the first stage turbine.

The combustion gases discharged from the turbine nozzle must necessarily flow over the axial gap and rotor seal therebetween to reach the turbine blades. The rotary seal cooperates with the internal pressurized purge air being channeled through the axial gap to prevent backflow of the hot combustion gases into the purge cooling circuit.

Accordingly, the smooth flow of the hot combustion gases is interrupted at the inner band-platform axial gap, and the purge air mixes with the combustion gases at this site and further degrades smooth flow.

Flow separation of the combustion gases occurs at this rotary seal and the combustion gases mix with the different velocity purge air for collectively further reducing efficiency.

Efficiency losses at this location decrease the total pressure of the combustion gases available at the turbine blades, which in turn corresponding reduces turbine efficiency. And, the disrupted flow at the beginning of the blade platforms can lead to increased heating thereof.

Accordingly, it is desired to provide a turbine stage having an improved rotary seal between the stator nozzle and rotor blades for improving turbine efficiency.

BRIEF DESCRIPTION OF THE INVENTION

A turbine stage includes a stator nozzle having a row of vanes mounted between inner and outer bands. The inner band terminates in an ovate ledge converging aft from the vanes with radially outer and inner convex surfaces joined at a convex apex. The ovate ledge reduces aerodynamic losses at the rotary seal with a row of following turbine rotor blades.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
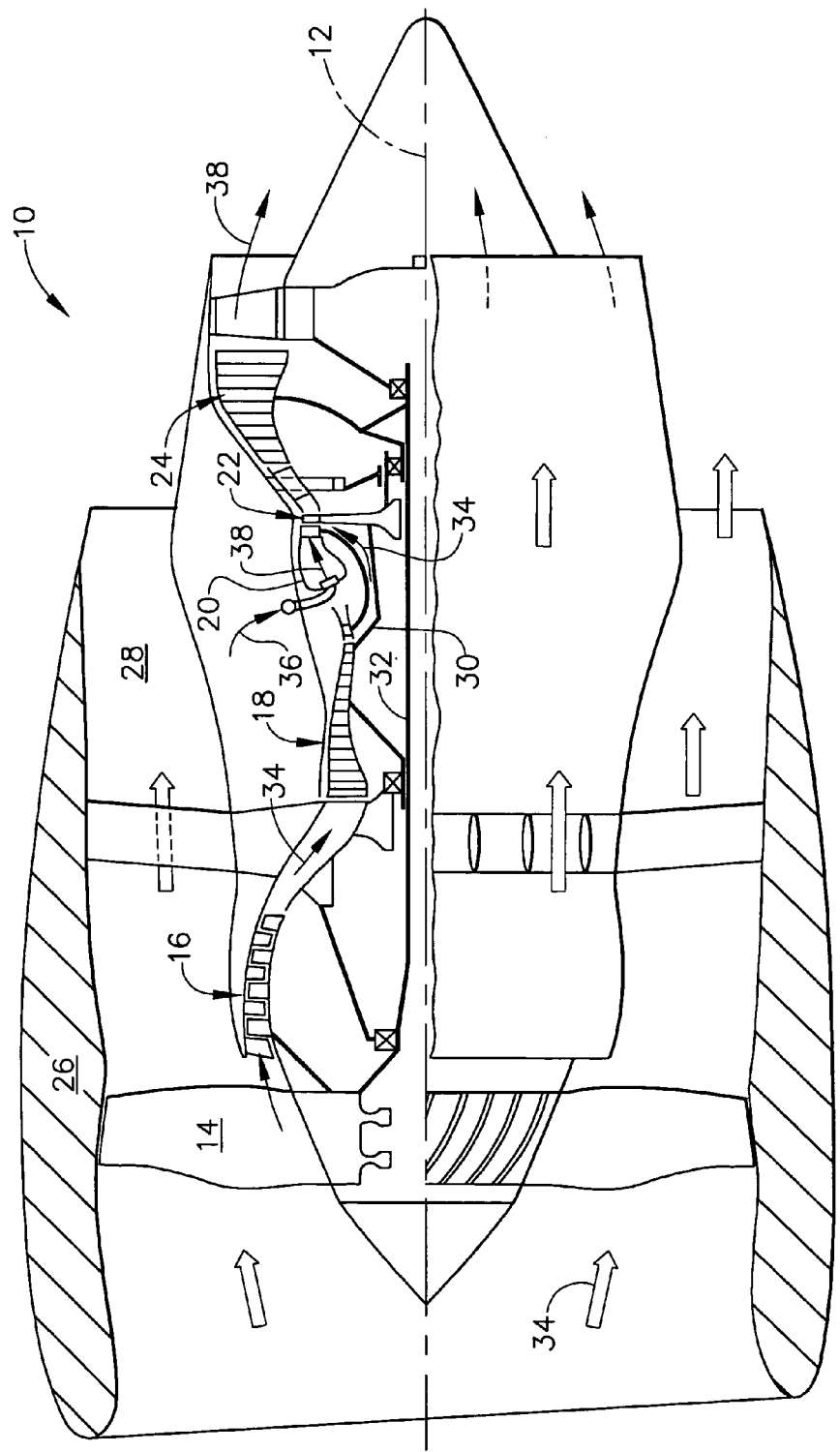
FIG. 1 is a partly sectional, axial schematic view of a turbofan gas turbine engine.

Illustrated schematically in FIG. 1 is an exemplary turbofan aircraft gas turbine engine 10. The engine is axisymmetrical about a longitudinal or axial centerline axis 12 and is suitably mounted to the wing or a fuselage of an aircraft (not shown) for powering an aircraft in flight in an exemplary application.

The engine includes in serial flow communication a fan 14, a low pressure or booster compressor 16, a high pressure (HP) compressor 18, an annular combustor 20, a high pressure turbine (HPT) 22, and a low pressure turbine (LPT) 24.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. The two drive shafts are suitably mounted in bearings in corresponding frames within the engine in a conventional configuration of the various engine components described above.

During operation, ambient air 34 enters the inlet of the engine and is pressurized in part by the fan 14 and discharged through the bypass duct 28 for providing a majority of propulsion thrust. Some of the air 34 passing the fan enters the booster compressor 16 and undergoes a further compression cycle in the multiple axial stages thereof, with additional compression also being provided in the HP compressor 18 in the multiple axial stages thereof.

The pressurized air 34 is discharged from the compressor and suitably mixed with fuel 36 in the combustor 20 for generating hot combustion gases 38. Energy is extracted from the combustion gases 38 in the HPT 22 to drive the first shaft 30 and power the HP compressor 18. Additional energy is extracted from the combustion gases in the LPT 24 to drive the second shaft 32 and power the fan 14 and booster compressor 16.

The engine as described above is conventional in configuration and operation and includes multiple compression stages and multiple turbine stages. For example, the booster compressor 16 may have four axial stages including four rows of compressor blades alternating axially with four rows of inlet guide vanes.

The high pressure compressor 18 may include seven axial stages for example, having seven rows of compressor blades alternating axially with corresponding rows of inlet guide vanes, and discharging the CDP air 34 through a conventional diffuser.

The HPT 22 is a single stage turbine followed in turn by an exemplary five stage LPT 24.

Figure 2:
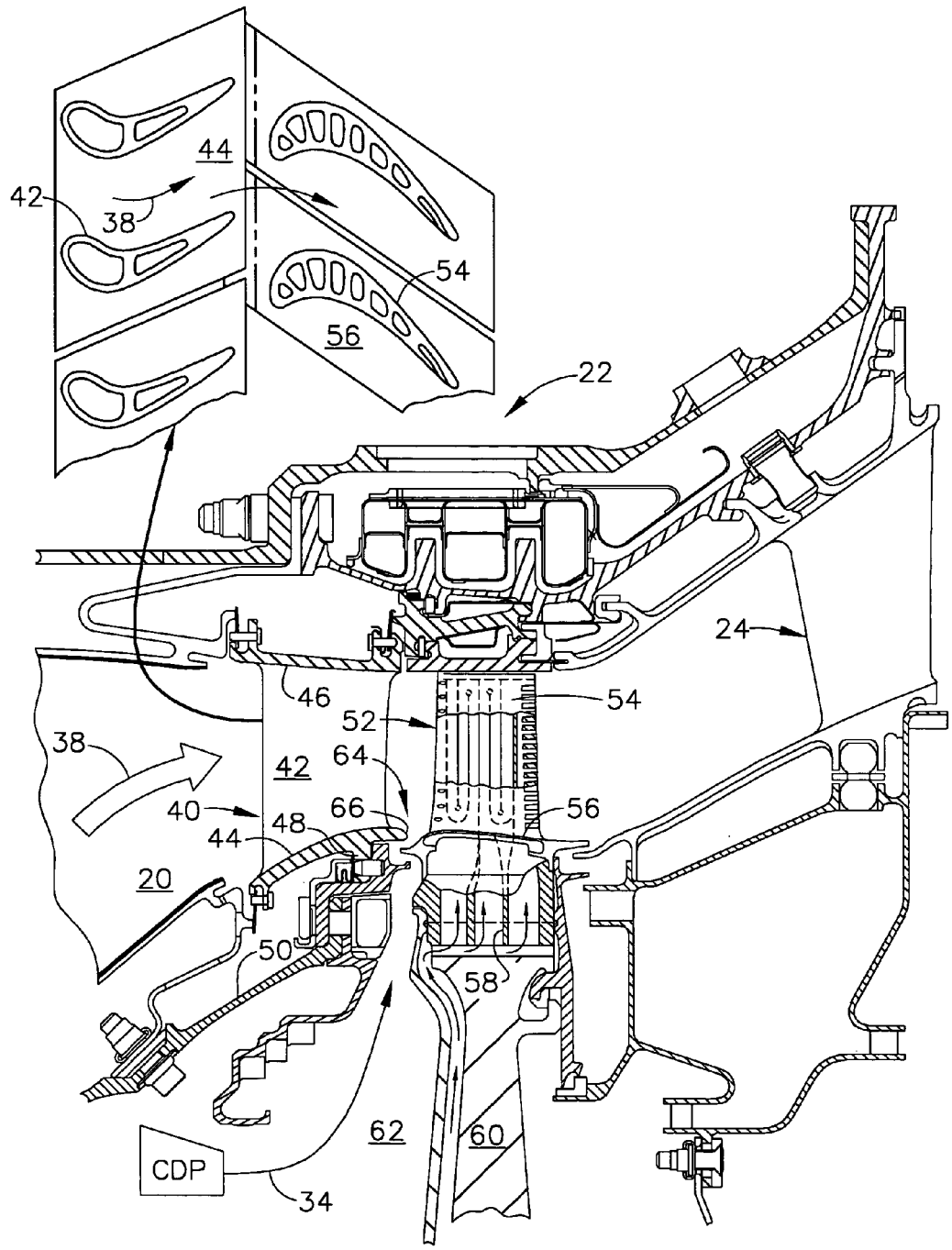
FIG. 2 is an enlarged, axial sectional view of the high pressure turbine illustrated in FIG. 1.

FIG. 2 illustrates in more detail the HPT 22 disposed in serial flow communication between the outlet of the combustor 20 and the inlet of the LPT 24.

The HPT 22 includes a first stage or HP turbine nozzle 40 having a row of stator vanes 42 suitably mounted in inner and outer bands 44,46.

Typically, two nozzle vanes 42 are integrally joined together in corresponding arcuate segments of the bands in a nozzle doublet in a unitary configuration. And, a full row of the doublets completes the annular nozzle.

The inner band 44 typically includes a radially inwardly extending mounting flange 48 suitably fixedly attached to a corresponding flange on a conical nozzle support 50, by a row of fastening bolts for example.

Following the vanes is a single row of HP turbine blades 52 which extract energy from the combustion gases. Each blade 52 includes an airfoil 54 extending radially outwardly from an integral platform 56 defining the radially inner boundary for combustion gases 38. The platform 56 is integrally joined to a supporting dovetail 58 mounted in a corresponding dovetail slot in the perimeter of a supporting rotor disk 60.

The disk 60 is fixedly joined to the first drive shaft 30 which in turn is fixedly joined to the rotor disks supporting the compressor blades of the high pressure compressor 18. The disk is spaced axially from the mounting flange 48 and nozzle support 50 to define an annular forward plenum or cavity 62 through which a portion of the pressurized CDP air 34 is channeled as purge air.

Each nozzle vane 42 has the typical airfoil shape with a generally concave pressure side and a generally convex opposite suction side extending axially in chord between the upstream leading edge and the downstream trailing edge. Correspondingly, the airfoil portion 54 of the first stage turbine blades 52 has the generally concave pressure side and generally convex opposite suction side extending axially between the leading and trailing edges thereof.

The vanes 42 and blades 52 may have any suitable internal cooling configuration. FIG. 2 illustrates forward and aft cooling cavities for the vanes. The blades have a pair of three-pass serpentine cooling channels over the midchord region, with corresponding inlets through the dovetail. And, the blade leading and trailing edges have dedicated cooling channels therefor.

In this way, pressurized air is bled from the compressor and channeled through the several internal cooling circuits of the vanes 42 and blade 52 for providing internal cooling thereof in any conventional manner, with the spent air then being discharged through various rows of outlet holes found in the pressure and suction sides of the airfoils from the leading edge to the trailing edge.

The annular nozzle inner band 44 illustrated in FIG. 2 terminates aft in radial position or elevation with the forward end of the row of blade platforms 56 extending circumferentially together in another full annulus. The inner band and blade platforms are therefore axially coextensive at similar radial elevation to provide a substantially continuous inner flowpath or boundary for the hot combustion gases 38 being channeled through the main flowpath between the nozzle vanes and turbine blades.

The row of turbine blades 52 and corresponding inner platforms 56 axially adjoin the annular inner band 44 of the turbine nozzle at a small axial gap therebetween having an annular rotary seal 64 defined therebetween for restraining discharge of the purge air 34 from the forward cavity 62 into the main turbine flowpath, while preventing backflow of the hot combustion gases into that cavity.

The purge air has sufficient pressure locally greater than the pressure of the combustion gases to ensure discharge or outflow of the purge air through the rotary seal 64 and into the main flowpath along the junction of the nozzle inner band and the blade platforms.

As indicated above, this axial gap between the stator nozzle 40 and the rotor blades 52 provides a local interruption in the otherwise smooth inner flowpath for the hot combustion gases.

Furthermore, the purge air 34 being discharged from the rotary seal necessarily mixes with the local combustion gases and provides additional aerodynamic losses therewith.

Since the discharging purge flow 34 meets the combustion gases at this stator-rotor interface, the different velocities of the air and gas flow, mixing, and flow separation all contribute to a reduction in turbine efficiency.

Accordingly, both the turbine nozzle and rotor blades are specifically modified as described hereinbelow for reducing these aerodynamic losses, and correspondingly increasing turbine efficiency.

Figure 3:
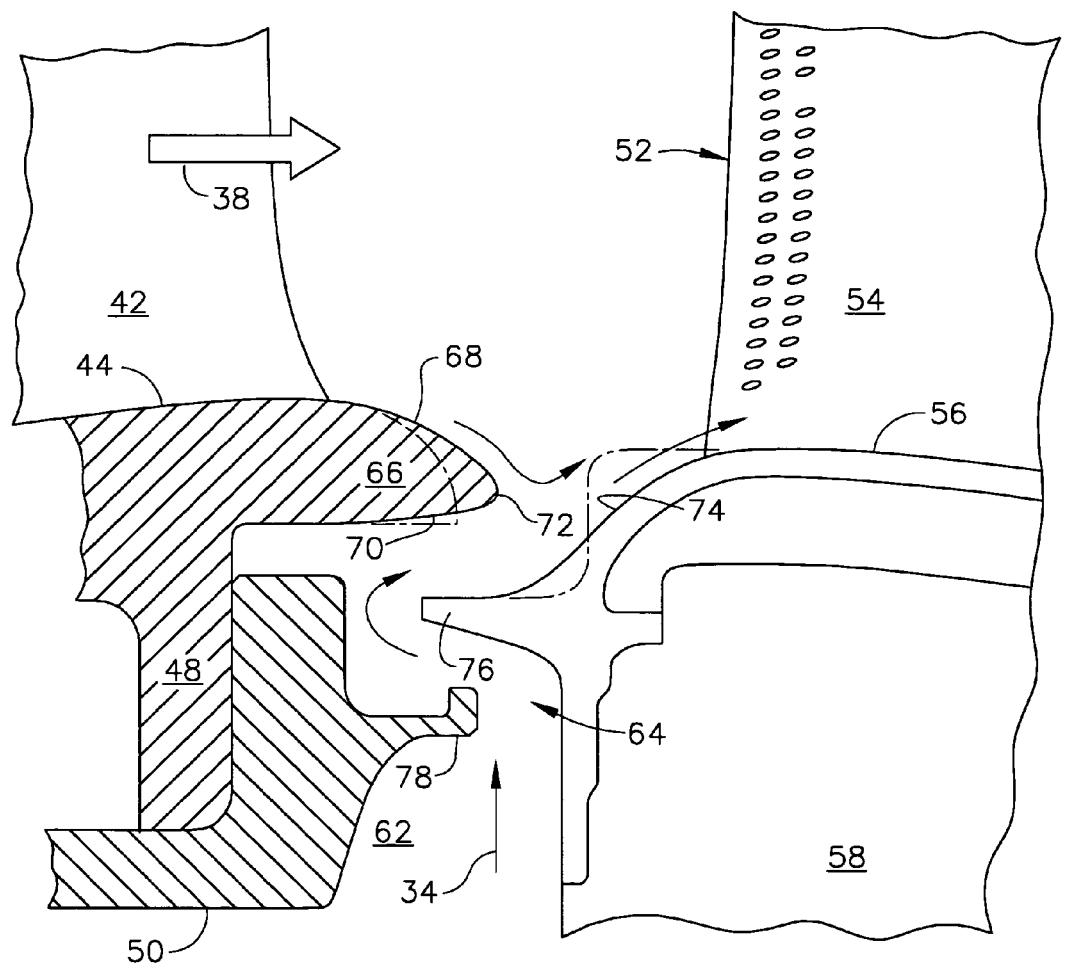
FIG. 3 is a further enlarged, axial sectional view of the rotary seal between the stator nozzle and rotor blades shown in FIG. 2.

More specifically, and illustrated in more detail in FIG. 3, the nozzle inner band 44 terminates at its aft end in an oval or ovate lip or ledge 66 which is cantilevered aft from the row of nozzle vanes 42 generally coextensive with the row of blade platforms 56. The ovate ledge 66 converges axially aft from the trailing edge of the vanes 42, and has radially outer and inner, axially convex surfaces 68,70 smoothly joined together at a convex apex 72 defining the trailing edge of the inner band.

The ovate aft ledge 66 of the inner band is aerodynamically streamlined to cooperate with the blade platforms 56 at the rotary seal 64 to reduce aerodynamic losses such as boattail drag, flow separation, and mixing losses between the combustion gases and purge air. In particular, the ledge outer surface 68 slopes smoothly radially inwardly at a greater slope rate than the ledge inner surface 70 sloping radially outwardly in the aft direction from the trailing edges of the nozzle vanes 42.

The convex curvature of the outer surface 68, as represented by its radius of curvature, is less than the convex curvature of the lower surface 70, with the radial extent or depth of the convex outer surface 68 being substantially greater than the shallow convex extent or depth of the lower surface 70. The convex apex 72 joins together the deeply inclined outer surface 68 and the shallow inner surface 70 at an even smaller radius of curvature in aerodynamically smooth transitions.

In this way, the boundary flow of the combustion gases 38 will follow radially inwardly the convex outer surface 68 of the ledge to the axial gap with the blade platforms, using the Coanda effect to delay flow separation. And, the purge air 34 from the forward cavity 62 will follow aft the shallow inner surface 70 for initially premixing with the combustion gases at the interface thereof immediately downstream of the apex 72.

Correspondingly, each blade platform 56 includes an integral serpentine forward ramp 74 extending radially inwardly and axially forwardly from the leading edge of the airfoil 54 to terminate at an integrated rotary seal wing 76 extending axially below the stator ledge 66 to define the rotary seal 64 therewith. The wing 76 is cantilevered forward from the blade dovetail, and the nozzle ledge 66 is cantilevered aft from the vanes 42, and the ledge 66 and wing 76 overlap each other axially in substantial part.

FIG. 3 illustrates in phantom another improved configuration of the aft end of the inner band cooperating with a conventional, blunt configuration of the platform 56 for comparison purposes. The aerodynamic performance of the turbine nozzle and rotor blades is controlled by the thermodynamic cycle of the entire engine which correspondingly fixes the configuration of the nozzle vanes 42 and supporting bands, as well as the nominal configuration of the turbine airfoils 54 and their platforms 56.

Accordingly, the specific configurations of the nozzle inner band and blade platforms where they meet at the interface rotary seal 64 therebetween are mutually interdependent and affect aerodynamic performance of the turbine by reducing the overall efficiency thereof. Reducing aerodynamic losses in this region will correspondingly increase turbine efficiency.

The ovate aft ledge 66 of the nozzle inner band permits an increase in axial overlap between the ledge 66 and seal wing 76 as evident from its location relative to the phantom configuration. Furthermore, the ovate ledge 66 may have a higher elevation inner surface 70 which increases the radial gap or clearance with the seal wing 76.

And, these advantages in configuration are made possible by the serpentine configuration of the ramp 74 which aerodynamically integrates the forward portion of the blade platform 56 with the seal wing 76.

FIG. 3 illustrates the serpentine ramp 74 relative to the conventional, blunt interface, shown in phantom, between the conventional configurations of the wing 76 and platform 56. The ramp 74 provides an aerodynamically shallower interface between the wing 76 and the outer surface of the platform 56 and includes an axially concave forward portion disposed radially above the wing 76, and an axially convex aft portion extending aft therefrom and disposed forward of or before the leading edge of the airfoil 54.

Since the curvature of the ramp 74 changes from concave to convex in the axial downstream direction, a suitable inflection point is provided axially therebetween at which the respective centers of curvature change sides on the ramp.

In the exemplary embodiment, the concave and convex portions of the forward ramp 74 have substantially equal magnitudes of curvature, and substantially similar, but mirror, profiles and length in the axial direction. The sizes of the opposite concave forward portion and convex aft portion of the ramp 74 are also generally equal, with the forward concave portion increasing in elevation above the conventional seal wing, whereas the convex aft portion decreases in elevation from the conventional blunt leading edge of the blade platform, with the transition therebetween occurring at about the mid-elevation of the blunt face bridging radially the different elevations of the outer surfaces of the wing 76 and platform 56.

The ovate profile of the ledge 66 cooperates with the serpentine profile of the platform ramp 74 for improving aerodynamic performance. In particular, the convex ledge inner surface 70 may radially and axially overlap a substantial portion of the concave forward portion of the ramp 74, with more axial overlap than previously possible.

And, the radial clearance between the ledge inner surface 70 and the seal wing 76 may also be increased more than previously possible for discharging the purge air more efficiently into the combustion gases flowing axially aft thereover at the rotary seal 64.

Furthermore, the concave forward portion of the ramp 74 preferably terminates in elevation at about the elevation of the inner surface 70 of the ovate ledge 66.

In this configuration, the concave ramp forward portion and the convex ledge inner surface 70 define an axial flow channel radially therebetween having an initial axial inlet turning radially outwardly to an outlet throat of minimum flow area at the ledge apex 72. The ledge 66 and ramp 74 may therefore define a metering outlet for the purge air 34 discharged from the forward cavity 62 at the rotary seal.

From the outlet throat aft, the discharge purge air and adjacent boundary of combustion gases are free to flow and expand without structural constraint as they smoothly transition over the blade platforms 56 between adjacent blades in the rotor stage.

Nominally, the inner band 44 and platform 56 are axially coextensive at the rotary seal 64 with substantially equal radial elevation to minimize the flowpath discontinuity therebetween at the rotary seal 64. From this nominal elevation, the convex ledge outer surface 68 and the convex aft portion of the ramp 74 converge together radially inwardly toward the seal wing 76.

In this way, the two converging surfaces provide a local pocket or recess which is aerodynamically smooth and draws inwardly the boundary flow of the combustion gases for mixing with the purge air being smoothly discharged upwardly along the platform ramp 74.

The convex outer surface 68 delays flow separation of the combustion gases in the aft direction, and permits premixing of the combustion gases with the purge air in the shallow pocket formed between the ledge and ramp.

Computational fluid dynamics (CFD) analysis predicts a substantial improvement in aerodynamic efficiency of the turbine stage employing the ovate-serpentine interface. This interface may reduce aerodynamic losses and correspondingly increase total pressure of the combustion gases at the leading edges of the airfoils resulting in an efficiency increase up to about a fraction of one percent, for example.

Furthermore, the improved configuration of the ovate ledge 66 and cooperating platform ramp 74 reduces mixing of the purge air and combustion gases at the rotary seal, and improves the cooling performance of the purge air along the ramp 74 itself. Analysis also predicts a substantial reduction in temperature on the blade platform 56 along the improved inlet ramp 74. Improved platform cooling may be used for increasing blade life, or may be used for decreasing the amount of cooling air which might otherwise be used for cooling the blade platform itself.

The rotary seal 64 illustrated in FIG. 3 further includes a stator seal wing 78 extending axially aft from the mounting flange 48, at the nozzle support 50 for example, which overlaps the oppositely extending rotor wing 76. In this way, the two angel wings 76,78 cooperate with the ovate ledge 66 to provide a circuitous or serpentine flowpath at the radially outer end of the forward cavity 62 for enhancing performance of the rotary seal 64.

Accordingly, by introducing into the otherwise conventional turbine nozzle and rotor blades the specifically configured ovate ledge 66 and serpentine ramp 74, improved aerodynamic performance may be obtained for substantially increasing efficiency of the turbine, and thereby of the engine. The ovate ledge 66 provides aerodynamic advantages for the nozzle itself, and provides additional advantage in cooperation with the serpentine ramp 74.

The cooperating ovate ledge and ramp delay in the axial direction flow separation of the combustion gas boundary flow and the collision thereof with the discharged purge air for reducing the aerodynamic discontinuity at the axial gap between the rotating blade platforms and the stationary nozzle inner band which collectively define the inner boundary for the main combustion gas flow from which energy is extracted in the turbine.

In the interface region between the discharged purge air and diverted combustion gases, the intermixed flow is subject to smaller circulation and less mixing, and permits the cooler purge air to thermally protect the forward portion of the blade platform 56, including the serpentine inlet ramp 74.

This configuration not only increases the total pressure of the combustion gases at the leading edges of the turbine blades 52 for increasing turbine efficiency, but also reduces the temperature of the blade platform along its leading edge. A cooler operating platform reduces thermal stresses therein and may increase the life thereof, or may be used for reducing any cooling air specifically provided for internally cooling the blade platform itself.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine stage comprising:
a stator nozzle including a row of stator vanes mounted between inner and outer bands, and said inner band includes a mounting flange;
a row of blades mounted to a perimeter of a rotor disk, and spaced from said mounting flange to define a forward cavity for channeling purge air through said forward cavity;
each blade having an inner platform adjoining said inner band at a rotary seal with said inner band; and
said inner band terminates in an ovate ledge converging aft from said vanes with radially outer and inner convex surfaces joined at a convex apex.

2. A stage according to claim 1 wherein said ledge outer surface slopes radially inwardly from said vanes at a greater rate than said ledge inner surface slopes radially outwardly from said vanes.

3. A stage according to claim 2 wherein each blade further includes an airfoil extending outwardly from said platform, and said platform includes a serpentine forward ramp extending radially inwardly and forward from said airfoil and terminating at a rotor wing extending below said ledge to define said rotary seal with said ledge.

4. A stage according to claim 3 wherein said ramp includes a concave forward portion above said wing, and a convex aft portion before said airfoil.

5. A stage according to claim 4 wherein said convex ledge inner surface overlaps said concave ramp forward portion.

6. A stage according to claim 5 wherein:
said inner band and platform are coextensive at said rotary seal; and
said convex ledge outer surface and convex aft portion of said ramp converge radially inwardly toward said rotor wing.

7. A stage according to claim 6 wherein said rotary seal further comprises a stator wing extending from said mounting flange below said rotor wing.

8. A stage according to claim 7 wherein said concave and convex portions of said ramp have substantially equal curvature.

9. A stage according to claim 7 wherein said concave forward portion of said ramp terminates in elevation at about said ledge inner surface.

10. A stage according to claim 7 wherein said concave forward portion of said ramp and convex ledge inner surface define an axial flow channel therebetween turning radially outwardly to a throat of minimum flow area at said apex.

11. A turbine stage comprising:
a stator nozzle including a row of vanes mounted between inner and outer bands; and
said inner band terminates in an ovate ledge converging aft from said vanes with radially outer and inner convex surfaces joined at a convex apex.

12. A stage according to claim 11 wherein said ledge outer surface slopes radially inwardly from said vanes at a greater rate than said ledge inner surface slopes radially outwardly from said vanes.

13. A stage according to claim 12 further comprising a row of blades mounted to a perimeter of a rotor disk, and each blade has an airfoil joined to an inner platform adjoining said ledge at a rotary seal with said ledge for reducing aerodynamic losses at said rotary seal.

14. A stage according to claim 13 wherein said blade platform includes a serpentine forward ramp extending radially inwardly and forward from said airfoil and terminating at a rotor wing extending below said ledge to define said rotary seal with said ledge.

15. A stage according to claim 14 wherein said ramp includes a concave forward portion above said wing, and a convex aft portion before said airfoil.

16. A stage according to claim 15 wherein said concave and convex portions of said ramp have substantially equal curvature.

17. A stage according to claim 15 wherein said convex ledge inner surface overlaps said concave ramp forward portion.

18. A stage according to claim 15 wherein:
said inner band and platform are coextensive at said rotary seal; and said convex ledge outer surface and convex aft portion of said ramp converge radially inwardly toward said rotor wing.

19. A stage according to claim 15 wherein:

said inner band further comprises a mounting flange; and said rotary seal further comprises a stator wing extending from said mounting flange below said rotor wing.

20. A stage according to claim 19 further comprising a forward cavity disposed between said nozzle and rotor disk in flow communication with said rotary seal for discharging purge air through said rotary seal.

21. A stage according to claim 15 wherein said concave forward portion of said ramp terminates in elevation at about said ledge inner surface.

22. A stage according to claim 15 wherein said concave forward portion of said ramp and convex ledge inner surface define an axial flow channel therebetween turning radially outwardly to a throat of minimum flow area at said apex.

* * * * *